United States Patent
Lee et al.

(10) Patent No.: US 9,232,414 B2
(45) Date of Patent: Jan. 5, 2016

(54) METHOD AND APPARATUS FOR FEEDBACK TRANSMISSION IN WIRELESS COMMUNICATION SYSTEM

(71) Applicant: Samsung Electronics Co., Ltd., Suwon-si, Gyeonggi-do (KR)

(72) Inventors: Jung-Hoon Lee, Daejeon (KR); Wan Choi, Daejeon (KR); Hyun-Kyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 14/096,400

(22) Filed: Dec. 4, 2013

(65) Prior Publication Data
US 2014/0155113 A1    Jun. 5, 2014

(30) Foreign Application Priority Data
Dec. 4, 2012   (KR) .................. 10-2012-0139705

(51) Int. Cl.
| | |
|---|---|
| H04B 7/00 | (2006.01) |
| H04W 24/02 | (2009.01) |
| H04W 16/14 | (2009.01) |
| H04W 88/08 | (2009.01) |
| H04B 7/02 | (2006.01) |
| H04B 7/06 | (2006.01) |

(52) U.S. Cl.
CPC .............. *H04W 24/02* (2013.01); *H04W 16/14* (2013.01); *H04B 7/022* (2013.01); *H04B 7/0617* (2013.01); *H04W 88/085* (2013.01)

(58) Field of Classification Search
CPC .............. H04W 16/14; H04W 72/085; H04W 72/0406
USPC ........ 455/501, 525, 67.11, 550.1, 422.1, 403, 455/509, 515, 507, 504, 512, 513, 514, 561, 455/562.1, 575.1; 370/310, 331, 328, 329, 370/332, 333, 338
See application file for complete search history.

(56) References Cited

U.S. PATENT DOCUMENTS

| | | | |
|---|---|---|---|
| 2010/0034173 A1* | 2/2010 | Luo et al. ...................... | 370/332 |
| 2011/0244866 A1* | 10/2011 | Yamamoto et al. ........... | 455/438 |
| 2012/0014272 A1* | 1/2012 | Zhou et al. .................... | 370/252 |
| 2012/0276945 A1* | 11/2012 | Chindapol et al. ............ | 455/525 |

FOREIGN PATENT DOCUMENTS

KR    20100102512 A    9/2010

* cited by examiner

Primary Examiner — Keith Ferguson
(74) Attorney, Agent, or Firm — Jefferson IP Law, LLP

(57) ABSTRACT

A method for operating a terminal in a wireless communication system is provided. The method includes determining a candidate group of serving distributed small base stations and determining feedback bits for maximizing an expected average rate when a service is provided from a distributed small base station that belongs to the candidate group of serving distributed small base stations.

24 Claims, 16 Drawing Sheets

QUANTIZATION

FEEDBACK

FEEDBACK SHARING

TERMINAL SELECTION AND SERVICE

METHOD AND APPARATUS FOR FEEDBACK TRANSMISSION IN WIRELESS COMMUNICATION SYSTEM

CROSS-REFERENCE TO RELATED APPLICATION(S)

This application claims the benefit under 35 U.S.C. §119 (a) of a Korean patent application filed on Dec. 4, 2012 in the Korean Intellectual Property Office and assigned Serial No. 10-2012-0139705, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Korea Advanced Institute of Science and Technology.

TECHNICAL FIELD

The present disclosure relates to a wireless communication system.

BACKGROUND

Because channel characteristics change over time in a wireless communication system, a transmitter knows channel information of a receiver and applies the channel information of the receiver depending on a situation, thereby improving performance of a communication system.

In particular, in a Multi-User (MU)—Multiple Input Multiple Output (MIMO) communication system or a cellular communication system in which the performance of the communication system is considerably affected by interference, a transmitter uses interference information of respective terminals, thereby considerably improving the performance of the system.

Generally, the transmitter may need to receive feedback information of a down link from a terminal in order to know the channel information of the down link.

Because the performance of the communication system is also considerably affected by interference from respective terminals in a virtual cellular network communication system, the transmitter needs to reduce performance degradation caused by the interference by using channel information of the respective terminals.

In contrast to an existing communication system according, according to the related art, because several distributed small base stations serve a plurality of terminals through sharing in the virtual cellular network communication system, a base station from which a terminal receives a service is not determined and an interference source varies in real time depending on the distributed small base station from which a service is provided. In addition, because each of the distributed small base stations uses imperfect channel information received from terminals when selecting terminals to be served by the distributed small base stations, there is a need for a feedback method considering such characteristics of a communication system.

However, an existing technology for improving the performance of a communication system relates to a system in which a base station that provides a service and an interference source are fixed for respective terminals. Therefore, the existing technology is not suitable to be applied to a virtual cellular network communication system in which respective base stations are not fixed with respect to whether to transmit signals or act as an interference source.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for feedback transmission in a wireless communication system.

Another aspect of the present disclosure is to provide a method and apparatus for transmitting feedback information in a Virtual Cellular Network (VCN) in which a transmitter that provides a service and an interference source are not fixed for each terminal.

Another aspect of the present disclosure is to provide a method and apparatus for efficiently dividing assigned feedback bits when a terminal quantizing a plurality of pieces of channel information in a virtual cellular network communication system, thereby averagely minimizing performance loss caused by incomplete channel information.

Another aspect of the present disclosure is to provide a method and apparatus for efficiently utilizing the amount of feedback that are limited resources in a virtual cellular network communication system, thereby averagely minimizing performance loss caused by incomplete channel information from a user terminal.

In accordance with an aspect of the present disclosure, a method for operating a terminal in a wireless communication system is provided. The method includes determining a candidate group of serving distributed small base stations and determining feedback bits for maximizing an expected average rate when a service is provided from a distributed small base station that belongs to the candidate group of serving distributed small base stations.

In accordance with another aspect of the present disclosure, an apparatus of a terminal in a wireless communication system is provided. The apparatus includes a control unit configured to determine a candidate group of serving distributed small base stations and to determine feedback bits for maximizing an expected average rate when a service is provided from a distributed small base station that belongs to the candidate group of serving distributed small base stations.

In accordance with yet another aspect of the present disclosure. a method of a base station in a wireless communication system is provided, the method includes receiving at least one feedback from at least one terminal, determining at least one terminal to be served by the base station by using the at least one feedback, and sharing determined terminal information with other base stations, wherein a size of each feedback is determined to maximize an expected average rate when a service is provided from the base station.

In accordance with still another aspect of the present disclosure, an apparatus of a base station in a wireless communication system, the apparatus includes a receiver configured to receive at least one feedback from at least one terminal, a control unit configured to determine at least one terminal to be served by the base station by using the at least one feedback and to share determined terminal information with other base stations, wherein a size of each feedback is determined to maximize an expected average rate when a service is provided from the base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure provide a method and apparatus for feedback transmission in a wireless communication system.

Various embodiments of the present disclosure relate to a method and apparatus for efficiently utilizing the amount of feedback that are limited resources in a Virtual Cellular Network (VCN) communication system, thereby averagely minimizing performance loss caused by incomplete channel information from a user terminal.

As a non-exhaustive illustration only, a terminal described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of wireless communication or network communication consistent with that disclosed herein.

Figure 1:
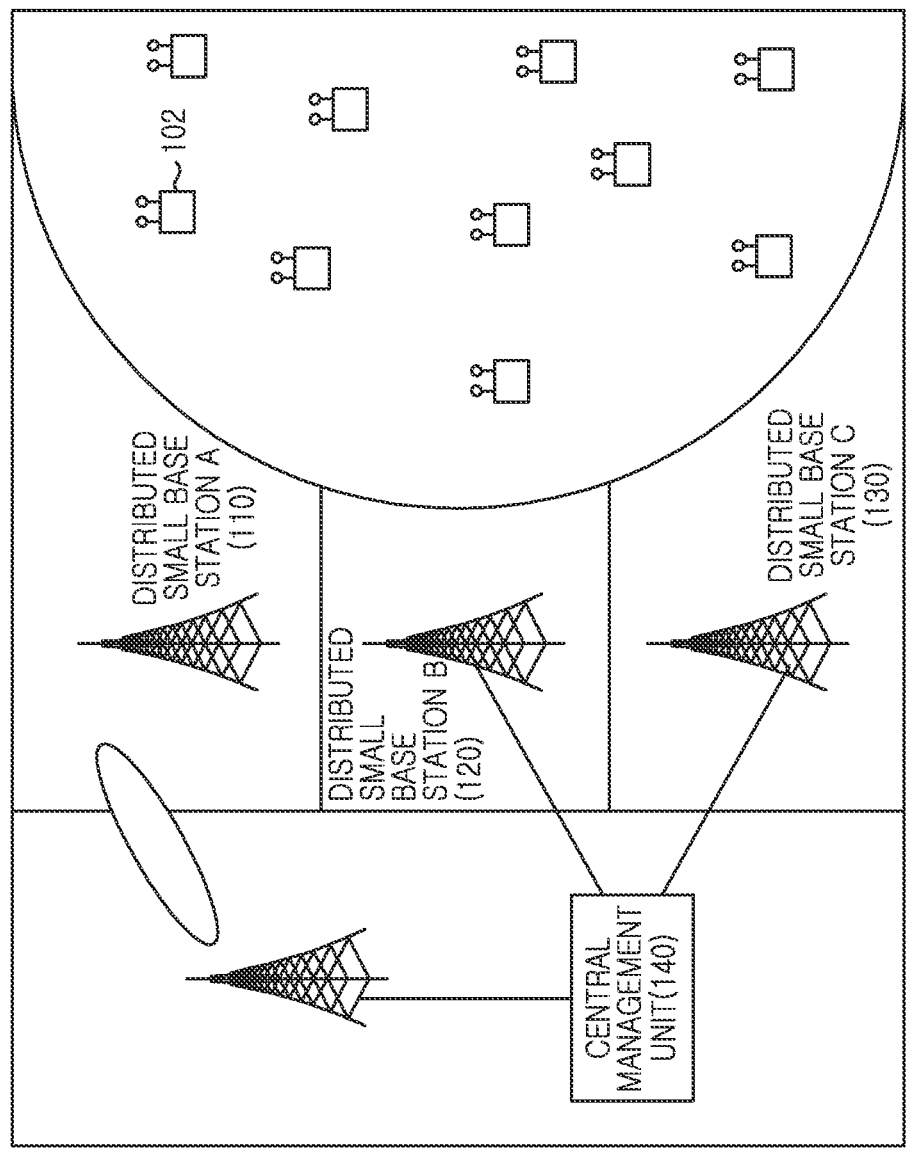
FIG. 1 is a diagram illustrating a virtual cellular network communication system according to an embodiment of the present disclosure.

FIG. 1 is a diagram illustrating a virtual cellular network communication system according to an embodiment of the present disclosure.

Referring to FIG. 1, a plurality of distributed small base stations (e.g., small base station A 110, small base station B 120, and small base station C 130) share at least one terminal 102 in the virtual cellular network communication system. In this case, the distributed small base stations 110, 120, and 130 may correspond to various types of base stations. For example, the distributed small base stations 110, 120, and 130 may be stationary or dynamically movable. The distributed small base stations 110, 120, and 130 are connected to a Central Management Unit (CMU) 140.

The distributed small base stations 110, 120, and 130 may correspond to various types of base stations, and the terminal 102 is located at different distances from the distributed small base stations 110, 120, and 130. Therefore, signals received by the terminal 102 from the respective distributed small base stations 110, 120, and 130 suffer from different path losses. The central management unit 140 may control the distributed small base stations 110, 120, and 130 and select terminals to be served by the distributed small base stations 110, 120, and 130.

FIGS. 2A, 2B, 2C, and 2D illustrate a diagram schematically illustrating a process for feedback transmission in a terminal according to an embodiment of the present disclosure.

Figure 2A:
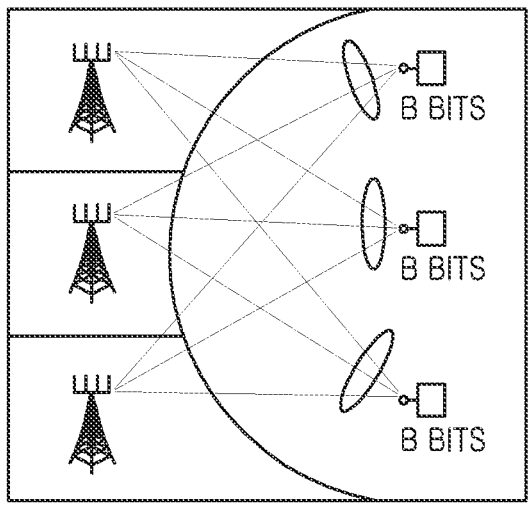
FIGS. 2A, 2B, 2C, and 2D are diagrams schematically illustrating a process for feedback transmission in a terminal according to an embodiment of the present disclosure.

Referring to FIGS. 2A, 2B, 2C, and 2D, first, as illustrated in FIG. 2A, respective terminals quantize all channels to be received by the terminal using total B bits. In this case, the respective terminals perform division of the B bits in consideration of the path losses of the respective distributed small base stations and quantize respective channels corresponding to the number of bits. The quantization process will be described below.

Figure 2B:
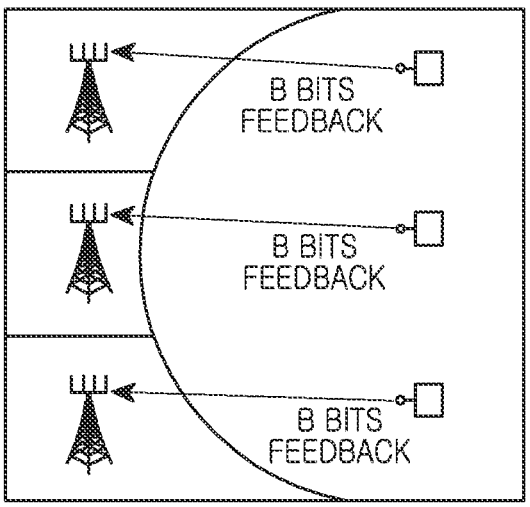

Thereafter, as illustrated in FIG. 2B, the respective terminals transmit channel information of B bits obtained by quantization of the terminal to the respective distributed small base stations. The distributed small base stations receive feedback information from the terminals.

Figure 2C:
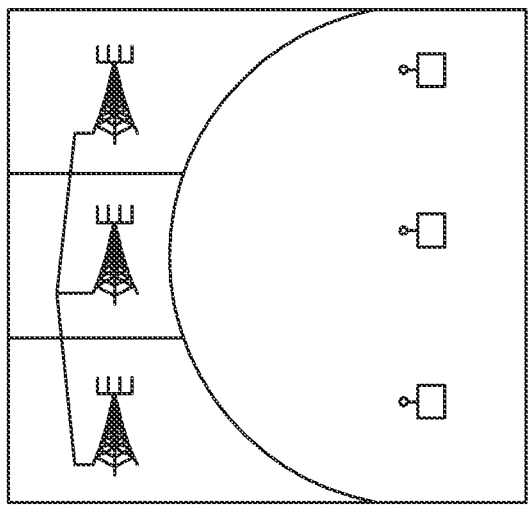

Thereafter, as illustrated in FIG. 2C, the distributed small base stations share the received feedback through backhaul, and determine which distributed small base stations serve which terminals.

Figure 2D:
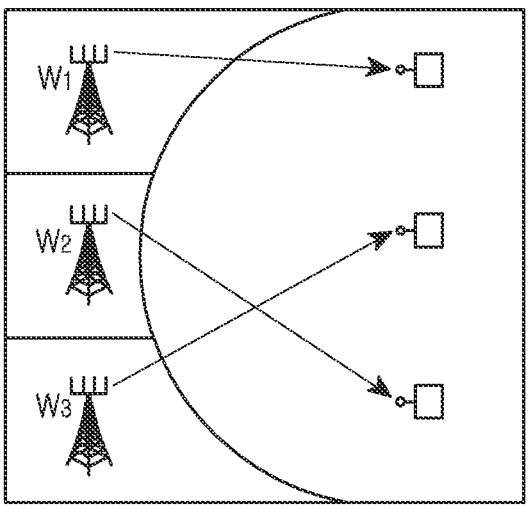

Through the above process, as illustrated in FIG. 2D, each of the distributed small base stations selects a terminal to be served by the distributed small base station itself and provides a service to the terminal (step d). In this case, although not illustrated, the central management unit may determine which distributed small base station serves which terminal.

According to various embodiments of the present disclosure, each of the terminals determines priority values for the respective distributed small base stations in order to determine from which distributed small base station the terminal receives a service.

For this purpose, according to various embodiments of the present disclosure, the terminal classifies the distributed small base stations into a candidate group of serving distributed small base stations and a candidate group of interference distributed small base stations.

In this case, a process of setting a threshold for determining the candidate group of serving distributed small base stations in the terminal will be described below.

When a terminal may detect signals from N distributed small base stations, the priority values of the N distributed small base stations are determined by Equation (1):

$$Xn = \alpha n \beta n \quad \text{Equation (1)}$$

where $\alpha n$ denotes a path loss value from an n-th base station, and $\beta n$ is a penalty value which the n-th base station has and is determined according to properties (e.g., backhaul capability) of the base station. As an example, when a $\beta n$ value is small, a probability that the n-th base station belongs to the candidate group of serving distributed small base stations decreases.

When the base station priority values of several distributed small base stations are [X1, X2, ..., XN] in a terminal, the distributed small base stations having the priority values larger than or equal to a predetermined value is determined as the candidate group (indicated by "S") of serving distributed small base stations.

In this case, as one of possible methods, the predetermined value X is determined and the distributed small base stations of which the priority values (Xn>X) exceed X may be determined as the candidate group of serving distributed small base stations. In this case, the candidate group of serving distributed small base stations is given as Equation (2):

$$S = \{n | Xn > X\} \quad \text{Equation (2)}$$

As another method, a method of calculating ratios of the priority values of other distributed small base stations to the priority value of a distributed small base station having the largest priority value, and determining distributed small base stations having priority values equal to or larger than a predetermined radio as a candidate group of serving distributed small base stations.

In this case, the candidate group of serving distributed small base stations is calculated as Equation (3):

$$S = \{n | Xn/\max(X1, X2, \ldots, XN) > 0.7\} \quad \text{Equation (3)}$$

A process of determining feedback bits of total B bits in a terminal will be described below.

First, it is assumed that there are N distributed small base stations and K terminals. In this case, it is assumed that a channel from a n-th distributed small base station to a k-th terminal is indicated by $h_{nk}$. In this case, respective terminals quantize respective channels using B bits.

The number of bits used to quantize $h_{1k}$, $h_{2k}$ and $h_{3k}$ to $\hat{h}_{1k}$, $\hat{h}_{2k}$, and $\hat{h}_{3k}$ using the B bits in the k-th terminal.

When the feedback information is shared by the respective distributed small base stations, channel information obtained by the n-th distributed small base station is $\hat{h}_{n1}$, $\hat{h}_{n2}$, and $\hat{h}_{n3}$.

In a case for which, when the distributed small base station n provides a service to terminal k, zeroforcing-beamforming is used to prevent interference to remaining terminals except for terminal k, a beam used for the distributed small base station n to provide a service to terminal k is given as Equation (4):

$$v_{nk} = \text{The } k\text{th normalized columns of } [\hat{h}_{n1}, \hat{h}_{n2}, \hat{h}_{n3}]^{-1} \quad \text{Equation (4)}$$

In this case, a signal received by terminal k is expressed as Equation (5):

$$y_k = h_{nk}^{\dagger} v_{nk} x_k + \sum_{j \neq n} \alpha_{jk} h_{jk}^{\dagger} v_{jk} x_j + n_k \quad \text{Equatioon (5)}$$

where $\alpha_{nk}$ is a path loss value from the distributed small base station n to terminal k.

Because the terminal k is provided with a service by one distributed small base station from the candidate group of serving distributed small base stations, an expected rate is calculated by Equation (6):

$$R_k^* = \frac{1}{|S|} E\left[\sum_{n \in S} \log_2\left(1 + P\left|h_{nk}^{\dagger} v_{nk}\right|^2\right)\right] \quad \text{Equation (6)}$$

Various embodiments of the present disclosure maximize the above-described rate, and determine the number of bits in consideration of the maximized expected rate, which is expressed as Equation (7):

$$\begin{array}{l} \underset{[b_1, \ldots, b_N]}{\text{maximize}} \; R_k \\ \text{subject to } \sum b_n = B \\ b_n \geq 0 \forall n \end{array} \quad \text{Equation (7)}$$

Equation (7) is obtained using a method to be described below.

An average transmission speed which terminal k may acquire when having perfect channel information is expressed as Equation (8):

$$R_k^* = \frac{1}{|S|} E\left[\sum_{n \in S} \log_2(1 + P|h_{nk}^\dagger v_{nk}|^2)\right] \quad \text{Equation (8)}$$

In this case, a loss value in the transmission speed which is calculated using the quantized channel information is defined by Equation (9):

$$\Delta R_k \triangleq R_k^* - R_k \quad \text{Equation (9)}$$

A value calculated in Equation (9) may be upper bound as Equation (10):

$$
\begin{aligned}
\Delta R_k &\overset{(a)}{\leq} \frac{1}{|S|} E\left[\sum_{n \in S} \log_2\left(1 + P\sum_{j \neq n} \alpha_{jk}|h_{jk}^\dagger v_{jk}|^2\right)\right] \\
&\overset{(b)}{\leq} \log_2\left(1 + \frac{P}{|S|} E\left[\sum_{n \in S} \sum_{j \neq n} \alpha_{jk}|h_{jk}^\dagger v_{jk}|^2\right]\right) \\
&\overset{(c)}{\leq} \log_2\left(1 + PE\left[\frac{\frac{|S|-1}{|S|}\sum_{n \in S} \alpha_{nk}|h_{nk}^\dagger v_{nk}|^2 + }{\sum_{n \in S^c} \alpha_{nk}|h_{nk}^\dagger v_{jk}|^2}\right]\right) \\
&\overset{(d)}{\leq} \log_2\left(1 + PE\left[\frac{\frac{|S|-1}{|S|}\sum_{n \in S} \alpha_{nk}\|h_{nk}\|^2|e_{nk}^\dagger v_{nk}|^2 Z_{nk} +}{\sum_{n \in S^c} \alpha_{nk}\|h_{nk}\|^2|e_{nk}^\dagger v_{nk}|^2 Z_{nk}}\right]\right) \\
&\overset{(e)}{\leq} \log_2\left(1 + \frac{NP}{N-1} E\left[\frac{\frac{|S|-1}{|S|}\sum_{n \in S} \alpha_{nk} 2^{-\frac{b_n}{N-1}} +}{\sum_{n \in S^c} \alpha_{nk} 2^{-\frac{b_n}{N-1}}}\right]\right) \\
&\overset{(f)}{\leq} \log_2\left(1 + \frac{NP}{N-1} E\left[\sum_{n=1}^N \alpha_{nk} 2^{-\frac{b_n}{N-1}} - \sum_{n \in S} \alpha_{nk} 2^{-\frac{b_n}{N-1}}\right]\right)
\end{aligned}
$$

Equation (10)

In Equation (10), (a) is established because of $\log(1+x) - \log(1+x/(1+y)) < \log(1+y)$. In addition, (b) may be calculated using Jensen's inequality, and be rewritten by (c). (d) may be expressed as Equation (11):

$$
\begin{aligned}
|h_{nk}^\dagger v_{nk}|^2 &= \|h_{nk}\|^2 |\tilde{h}_{nk}^\dagger v_{nk}|^2 \\
&= \|h_{nk}\|^2 \left|\left(\sqrt{1 - Z_{nk}^2}\,\hat{h}_{nk} v_{nk} + \sqrt{Z_{nk}}\,e_{nk}\right)^\dagger v_{nk}\right|^2 \\
&= \|h_{nk}\|^2 |e_{nk}^\dagger v_{nk}|^2 Z_{nk}
\end{aligned}
$$

Equation (11)

(e) may be calculated using Jensen's inequality and the attribute of Equation (12):

$$E\left[|e_{nk}^\dagger v_{nk}|^2\right] = \frac{1}{N-1} \quad \text{Equation (12)}$$

$$E[Z_{nk}] \leq 2^{-\frac{1}{N-1}}$$

In this case, quantization error is modeled by using Random Vector Quantization (RVQ) approach and when written, (f) may be calculated.

Therefore, Equation (7) may be expressed as Equation (13):

$$\underset{[b_1, \ldots, b_N]}{\text{minimize}} \sum_{n=1}^N \alpha_{nk} 2^{-\frac{b_n}{N-1}} - \sum_{n \in S} \alpha_{nk} 2^{-\frac{b_n}{N-1}} \quad \text{Equation (13)}$$

$$\text{subject to } \sum b_n = B, \; b_n \geq 0 \; \forall \, n$$

In Equation (13), because objective function and constraint function are convex functions, Equation (13) may be solved by using convex optimization.

In order to solve Equation (13), a Lagrangian function is defined by Equation (14):

$$L = \left[\sum_{n=1}^N \alpha_{nk} 2^{-\frac{b_n}{N-1}} - \sum_{n \in S} \alpha_{nk} 2^{-\frac{b_n}{N-1}}\right] + \mu\left(\sum b_n - B\right) \quad \text{Equation (14)}$$

According to a Karush-Kuhn-Tucker (KKT) condition, an optimized value $b^*_n$ may be calculated by Equation (15):

$$\frac{\partial L(b_n^*)}{\partial b_n} = 0 \quad \text{Equation (15)}$$

When Equation (15) is solved, Equation (16) is obtained.

$$b_n^* = \begin{cases} k + (N-1)\log_2\left(\frac{|S|-1}{|S|}\alpha_{nk}\right), & n \in S \\ k + (N-1)\log_2(\alpha_{nk}), & \text{otherwise} \end{cases} \quad \text{Equation (16)}$$

In Equation (16), K is expressed as Equation (17):

$$k = \frac{B}{N} - \frac{N-1}{N}\left[\sum_{n \in S}\log_2\left(\frac{|S|-1}{|S|}\alpha_{nk}\right) + \sum_{n \in S^c}\log_2(\alpha_{nk})\right] \quad \text{Equation (17)}$$

As seen from Equation (17), it is more beneficial to quantize more feedback bits as the channel state is more excellent (as the path loss of a channel is smaller).

When a terminal is provided with a service by a distributed small base station, the terminal determines the number of feedback bits in order to maximize an expected rate (e.g., average achievable rate).

Because a path loss is generally given as a function of distances, a path loss in a down link may be identical to the path loss in an up link, which may be known to respective receivers. Therefore, a transmitter may know how to divide feedback. As a result, no additional signaling load may be required in order for feedback division. Therefore, the transmitter may select terminals based on given channel information.

A process of obtaining feedback bits using the above-described method in a terminal and a process of determining a terminal to be served by a distributed small base station in the distributed small base station and a central management unit will be described below.

First, it is assumed that there are distributed small base stations A, B, and C, and a plurality of terminals. In this case, it is assumed that the distributed small base station is a base station using a wireless backhaul and that the backhaul capability thereof is smaller than the backhaul capability of other distributed small base stations (e.g., small base stations B and C).

Therefore, a predetermined penalty value is assigned to the distributed small base station rather than other distributed small base stations. In this case, the penalty value may be adjusted with the attribute values [βA, βB, βC] of base stations. For example, when [βA, βB, βC]=[0.8, 1, 1] is set, with respect to the base station A, the priority value thereof is multiplexed by 0.8 unlike the priority values of other base stations.

When it is assumed that path loss values obtained from the distributed small base stations A, B, C by one terminal are determined as [αA, αB, αC]=[1.2, 1, 0.4], the priority values of respective distributed small base stations may be obtained in the terminal. The path loss values may be transmitted to terminals by the distributed small base station. In addition, the terminal may measure the path loss values.

$$[X1, X2, X3] = [\alpha 1\beta 1, \alpha 2\beta 2, \alpha 3\beta 3] = [0.96, 1, 0.4] \qquad \text{Equation (18)}$$

In this case, the terminal generates a candidate group of serving distributed small base stations by using the priority values.

When the terminal uses a rule S={n|Xn/max(X1, X2, ..., XN)>0.7} in order to generate the candidate group of serving distributed small base stations, the candidate group of serving distributed small base stations becomes S={1, 2}.

As an example, in the case of determining feedback bits based on the above-described process of calculating feedback when the number of bits assigned to the terminal is 16 bits, the terminal may perform division into 6 bits, 6 bits, and 4 bits with respect to the channels from the distributed small base stations A, B, and C.

According to various embodiments of the present disclosure, the distributed small base station selects a terminal to be served by the distributed small base station itself by using feedback obtained from terminals. According to various embodiments of the present disclosure, process of selecting a terminal to be served by the distributed small base station may be performed in various methods. Alternatively, according to various embodiments of the present disclosure, the central management unit selects a terminal to be served by the distributed small base station and notifies respective distributed small base stations of a terminal to be served by the distributed small base station. Distributed small base stations which do not belong to the candidate group of serving distributed small base stations may be interference distributed small base stations.

Figure 3:
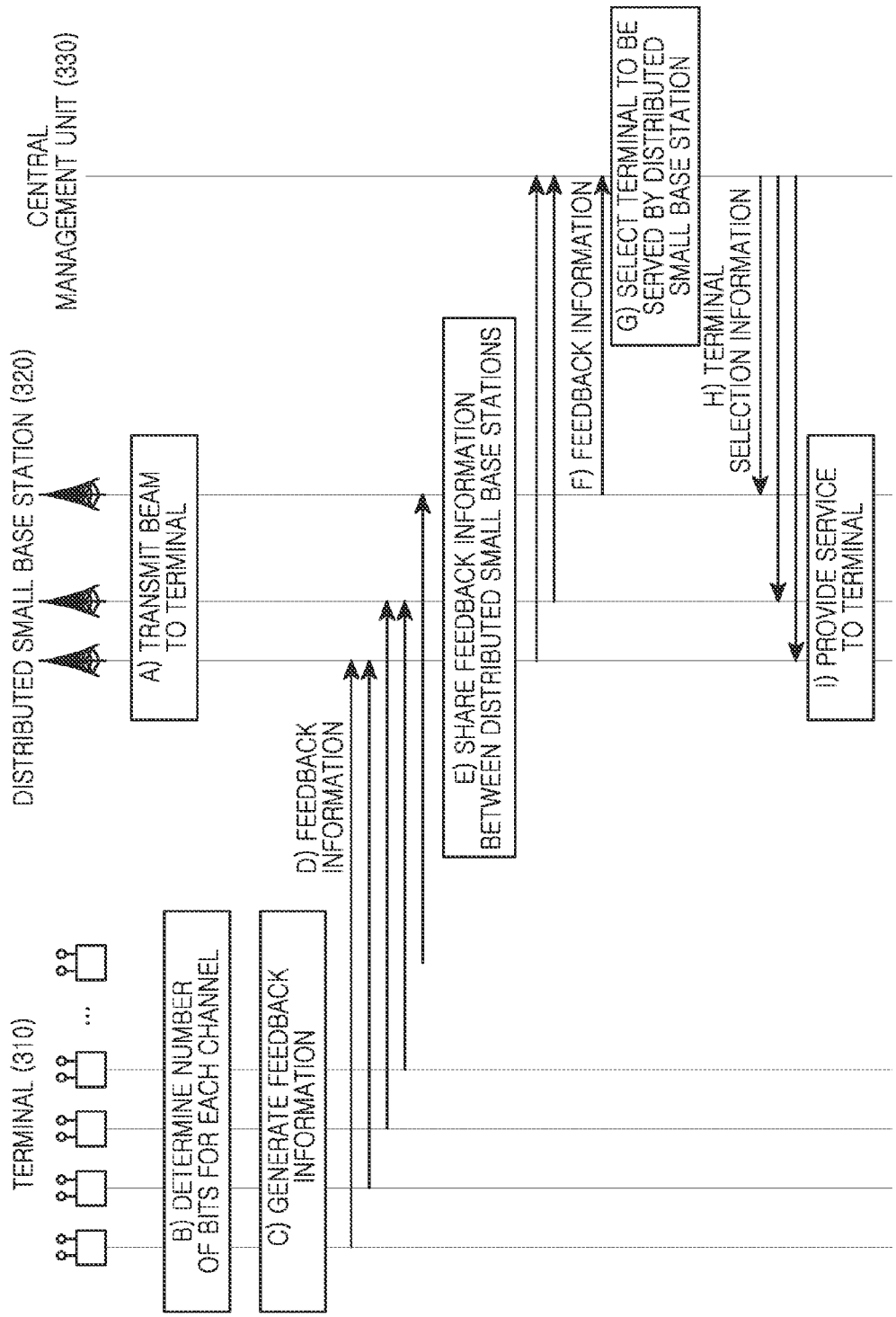
FIG. 3 is a message flowchart illustrating an operation process according to an embodiment of the present disclosure.

FIG. 3 is a message flowchart illustrating an operation process according to an embodiment of the present disclosure. For example, FIG. 3 illustrates a case in which a central management unit determines a terminal to be served by a distributed small base station.

Referring to FIG. 3, at operation A, a plurality of distributed small base stations 320 transmit a beam including a reference signal to a plurality of terminals 310.

Thereafter, at operation B, the terminal 310 determines the number of bits used to quantize channels for the plurality of distributed small base stations 320.

At operation C, the terminal 310 generates feedback. For example, the terminal 310 generates feedback information to be transmitted to the respective distributed small base station.

At operation D, the terminal 310 transmits the feedback to an arbitrary distributed small base station.

Thereafter, at operation E, the plurality of distributed small base stations 320 share a received feedback. For example, the plurality of distributed small base stations 320 share the received feedback among the plurality of distributed small base stations 320.

At operation F, the plurality of distributed small base stations 320 transmit the received feedback to the central management unit 330.

Thereafter, at operation G, the central management unit 330 determines to which terminal the respective distributed small base stations provide a service based on the received feedback.

At operation H, the central management unit 330 transmits a determination result to the distributed small base stations. For example, at this operation, the determination result may be shared.

Thereafter, at operation I, the distributed small base station 320 provides a service to a corresponding terminal 310.

Figure 4:
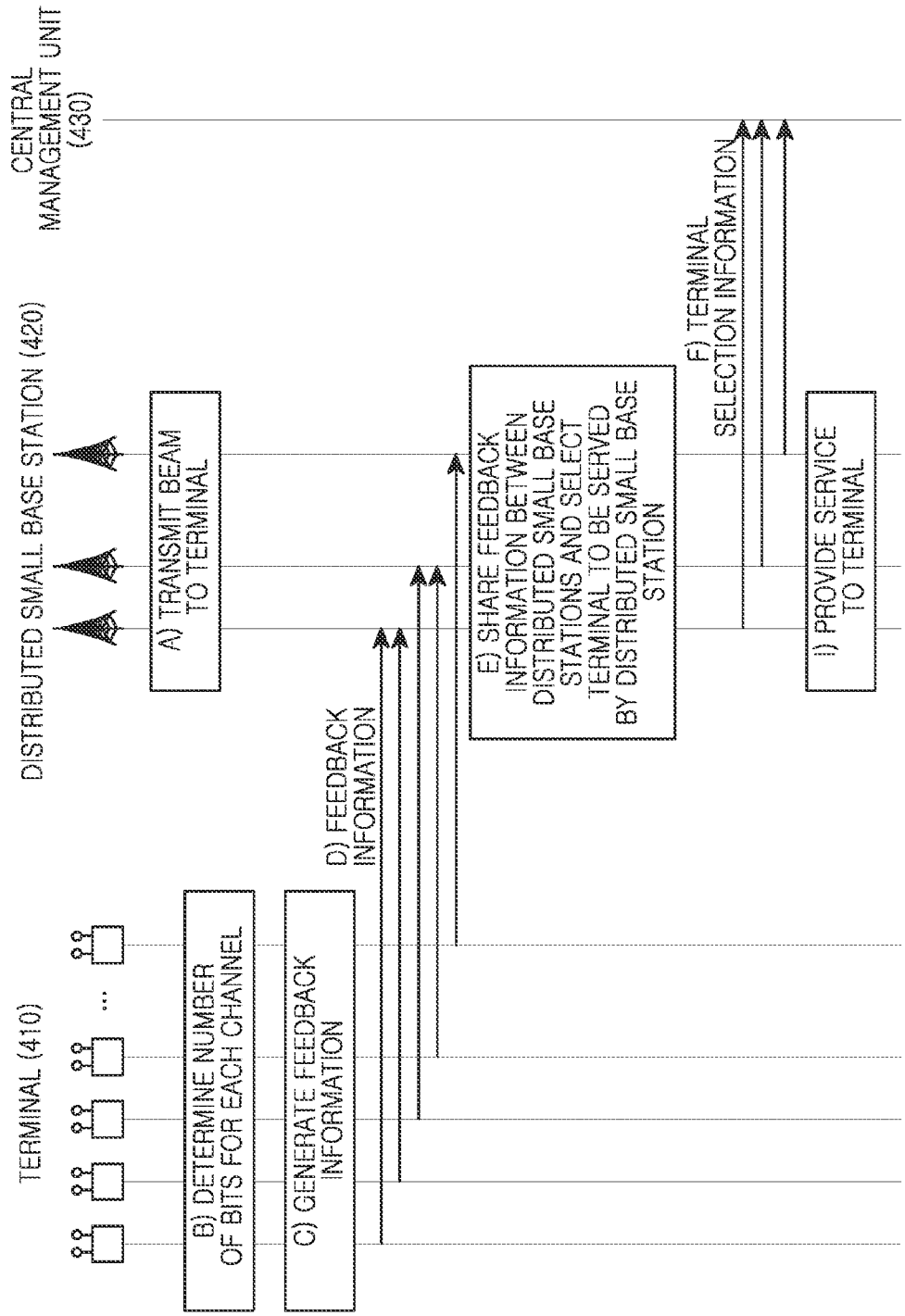
FIG. 4 is a message flowchart illustrating an operation process according to an embodiment of the present disclosure.

FIG. 4 is a message flowchart illustrating an operation process according to an embodiment of the present disclosure. For example, FIG. 4 illustrates a case in which a distributed small base station determines a terminal to be served by the distributed small base station.

Referring to FIG. 4, at operation A, a plurality of distributed small base stations 420 transmit a beam including a reference signal to a plurality of terminals 410.

Thereafter, at operation B, each of the plurality of terminals 410 determines the number of bits used to quantize channels for the plurality of distributed small base stations 420.

At operation C, each of the plurality of terminals 410 generates feedback. For example, each of the plurality of terminals 410 generates feedback information to be transmitted to the respective distributed small base station.

At operation D, each of the plurality of terminals 410 transmits the feedback to an arbitrary distributed small base station.

Thereafter, at operation E, the plurality of distributed small base stations 420 share a received feedback and determine to which terminal a service is provided based on the feedback.

Thereafter, at operation F, the plurality of distributed small base stations 420 transmit a determination result to a central management unit 430. For example, the plurality of distributed small base stations 420 transmit, to the central management unit 430, an indication as to which terminal a service is or is to be provided.

Thereafter, at operation G, the plurality of distributed small base stations 420 provide a service to the terminals 410.

Figure 5:
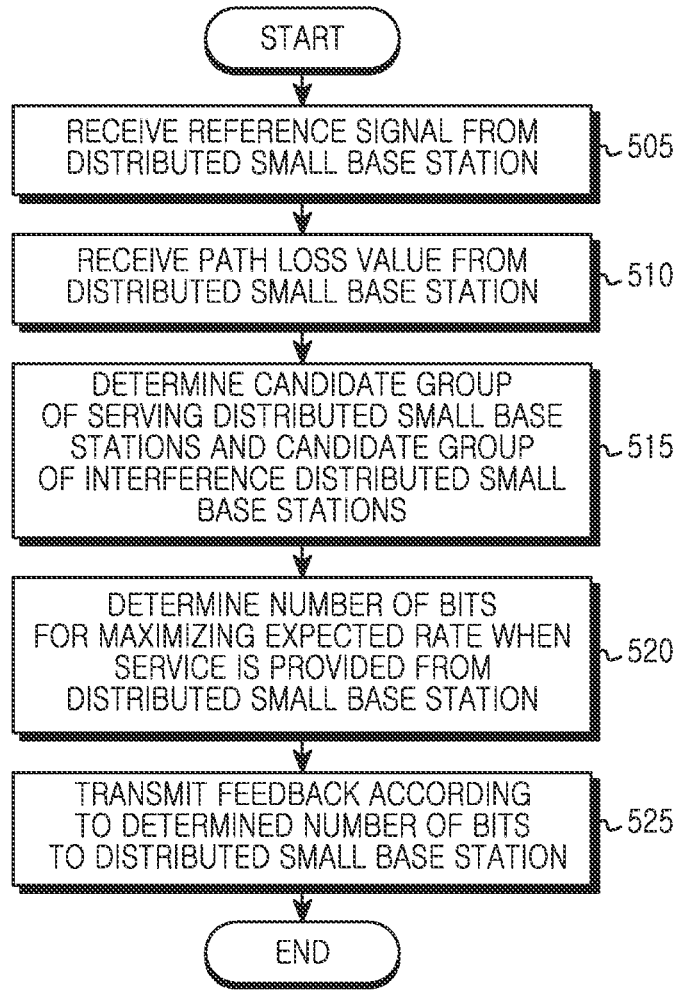
FIG. 5 is a flowchart illustrating an operation process of a terminal according to an embodiment of the present disclosure.

FIG. 5 is a flowchart illustrating an operation process of a terminal according to an embodiment of the present disclosure.

Referring to FIG. 5, at operation 505, the terminal receives a reference signal from a distributed small base station.

At operation 510, the terminal may receive a path loss value from the distributed small base station.

Thereafter, at operation 515, the terminal determines a candidate group of serving distributed small base stations and a candidate group of interference distributed small base stations. Operation 515 may be performed using the above-described induction operation in the description of FIG. 2.

Thereafter, when the terminal is provided with a service by the distributed small base station, at operation 520, the terminal determines the number of bits for maximizing an expected rate. The operation 520 may be performed using the above-described induction operation in the description of FIG. 2.

Thereafter, at operation 525, the terminal transmits a feedback according to the determined number of bits to an arbitrary distributed small base station.

Figure 6:
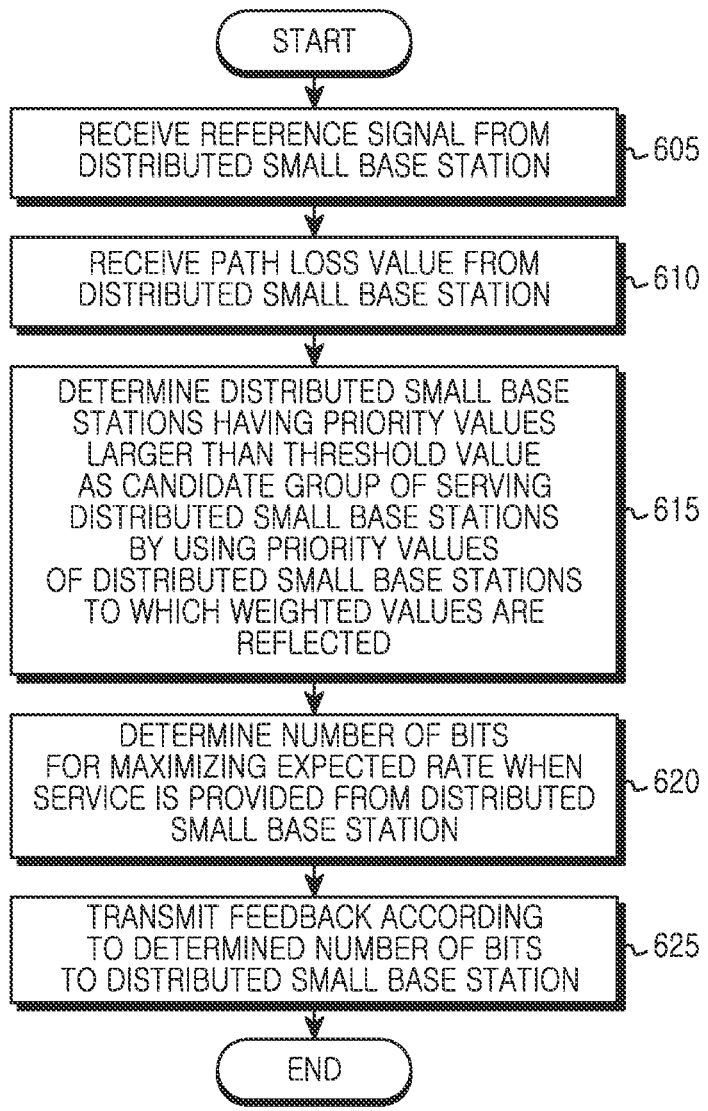
FIG. 6 is a flowchart illustrating an operation process of a terminal according to an embodiment of the present disclosure.

FIG. 6 is a flowchart illustrating an operation process of a terminal according to an embodiment of the present disclosure.

Referring to FIG. 6, at operation 605, the terminal receives a reference signal from a distributed small base station.

At operation 610, the terminal may receive a path loss value from the distributed small base station.

Thereafter, at operation 615, the terminal determines a candidate group of serving distributed small base stations and a candidate group of interference distributed small base stations. According to various embodiments of the present disclosure, the terminal determines distributed small base stations having priority values larger than a threshold value as the candidate group of serving distributed small base stations by using the priority values of distributed small base stations to which weighted values are reflected.

Thereafter, when the terminal is provided with a service by the distributed small base station, at operation 620, the terminal determines the number of bits for maximizing an expected rate. Operation 620 may be performed using the above-described induction operation in the description of FIG. 2.

Thereafter, at operation 625, the terminal transmits a feedback according to the determined number of bits to the distributed small base station.

As described above, according to various embodiments of the present disclosure, weighted values may be considered at the operation of determining a candidate group of serving distributed small base stations and a candidate group of interference distributed small base stations.

When substituting priority values considering weighted values for the priority values of base stations in Equation (1), Equation (1) may be rewritten as Equation (19):

$$Xn = \alpha n \beta n Wn \qquad \text{Equation (19)}$$

where Wn is a weighted value for distributed small base station n. The weighted value may represent a service class rank for distributed small base stations or connection priorities for distributed small base stations. The distributed small base stations may transmit the weighted values to the terminal in advance or the terminal may pre-store the weighted values.

Figure 7:
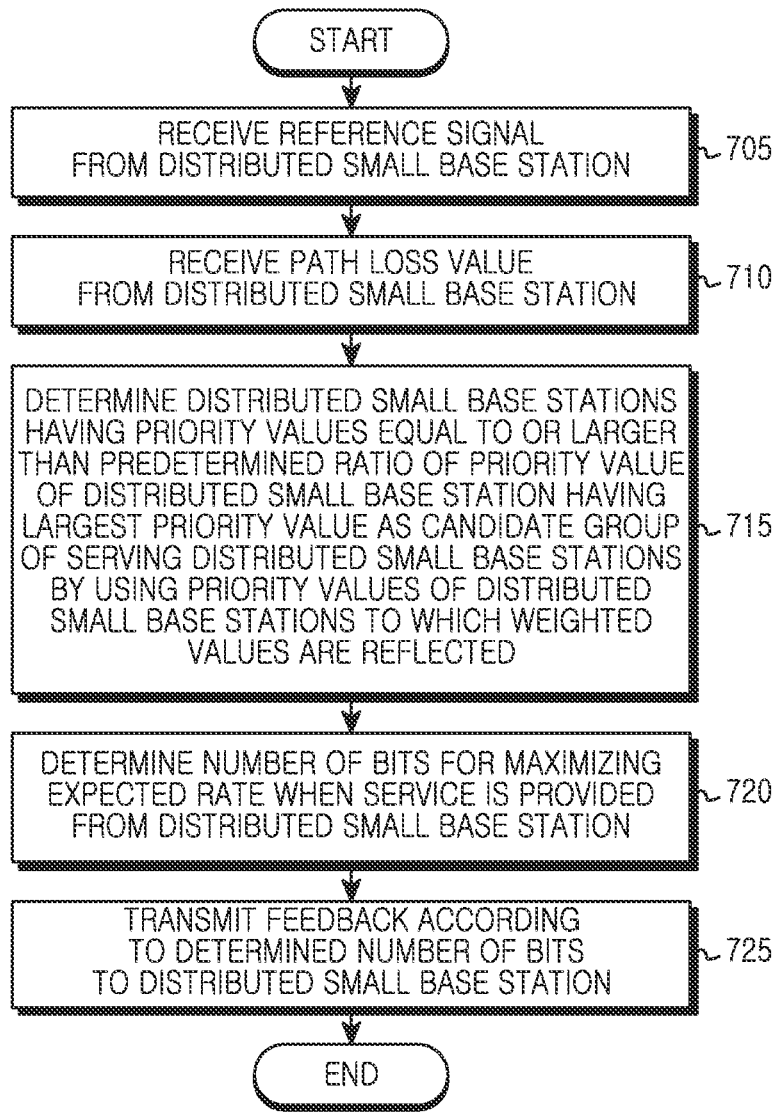
FIG. 7 is a flowchart illustrating an operation process of a terminal according to an embodiment of the present disclosure.

FIG. 7 is a flowchart illustrating an operation process of a terminal according to an embodiment of the present disclosure.

Referring to FIG. 7, at operation 705, the terminal receives a reference signal from a distributed small base station.

At operation 710, the terminal may receive a path loss value from the distributed small base station.

Thereafter, at operation 715, the terminal determines a candidate group of serving distributed small base stations and a candidate group of interference distributed small base stations. In this case, the terminal determines distributed small base stations having priority values equal to or larger than a predetermined ratio of the priority value of a distributed small base station having the largest priority value as the candidate group of serving distributed small base stations by using the priority values of distributed small base stations to which weighted values are reflected.

Thereafter, when the terminal is provided with a service by the distributed small base station, at operation 720, the terminal determines the number of bits for maximizing an expected rate. Operation 720 may be performed using the above-described induction operation in the description of FIG. 2.

Thereafter, at operation 725, the terminal transmits a feedback according to the determined number of bits to the distributed small base station.

When substituting priority values considering weighted values for the priority values of base stations in Equation (1), Equation (1) may be rewritten by Equation (19).

In Equation (19), Wn is a weighted value for the distributed small base station n. The weighted value may represent a service class rank for distributed small base stations or connection priorities for distributed small base stations. The distributed small base stations may transmit the weighted values to the terminal in advance or the terminal may pre-store the weighted values.

Figure 8:
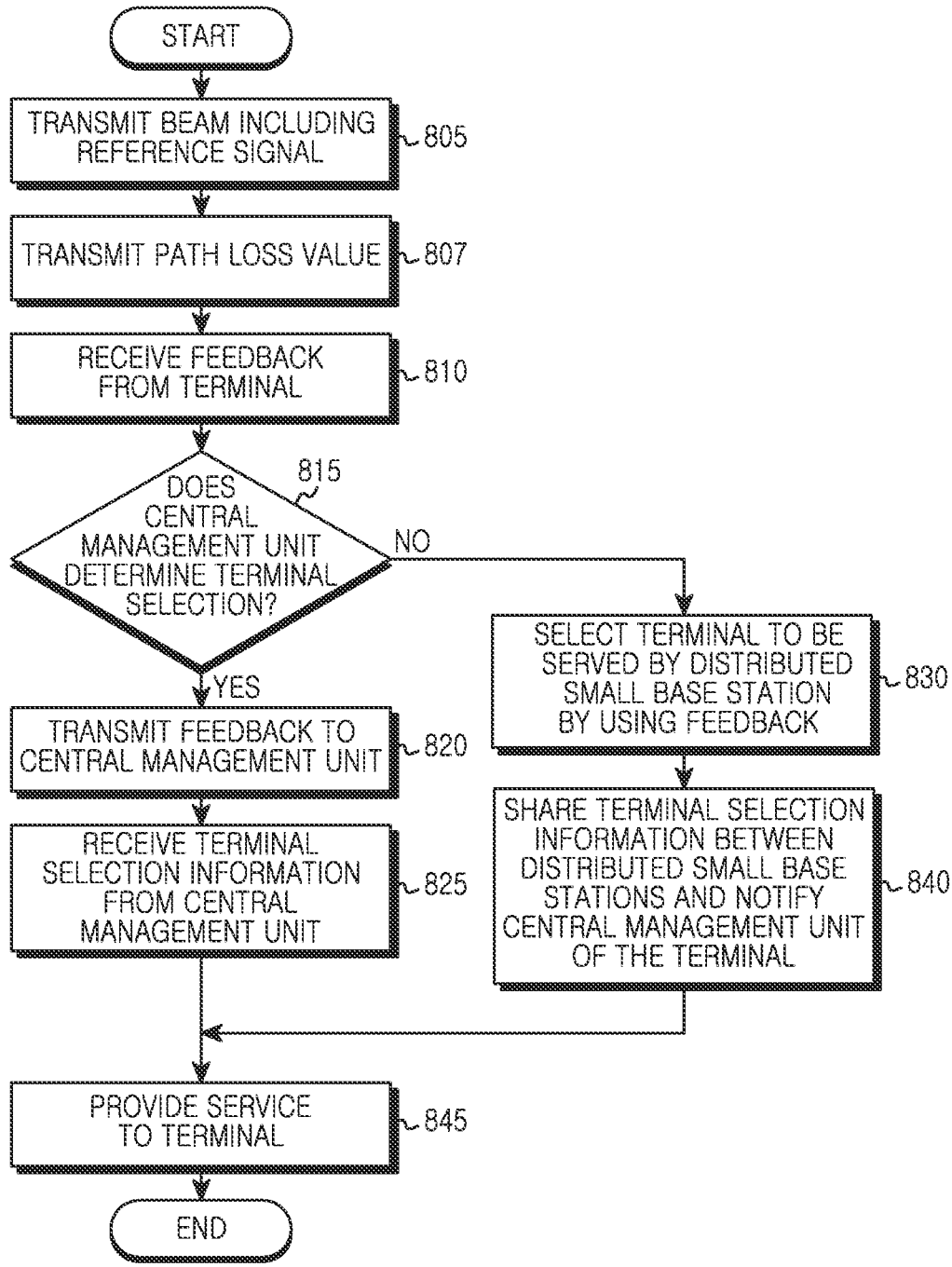
FIG. 8 is a flowchart illustrating an operation process of a distributed small base station according to an embodiment of the present disclosure.

FIG. 8 is a flowchart illustrating an operation process of a distributed small base station according to an embodiment of the present disclosure.

Referring to FIG. 8, at operation 805, the distributed small base station transmits a beam having a reference signal.

At operation 807, the distributed small base station may transmit a path loss value to a terminal.

Thereafter, at operation 810, the distributed small base station receives a feedback from the terminal.

At operation 815, the distributed small base station determines whether a central management unit determines terminal selection.

When the distributed small base station determines that the central management unit determines terminal selection at operation 815, the distributed small base station proceeds to operation 820 at which the distributed small base station transmits the received feedback to the central management unit.

At operation 825, the distributed small base station receives terminal selection information from the central management unit. Thereafter, the distributed small base station proceeds to operation 845.

At operation 845, the distributed small base station provides a service to selected terminals.

When the distributed small base station determines that the central management unit does not determine terminal selection at operation 815, the distributed small base station proceeds to operation 830 at which the distributed small base station performs a process of selecting a terminal to be served by the distributed small base station by using the feedback.

Thereafter, at operation 840, the distributed small base station shares the terminal selection information with distributed small base stations, and if required, notifies the central management unit of the terminal selection information. Thereafter, the distributed small base station proceeds to operation 845.

Thereafter, at operation 845, the distributed small base station provides a service to a corresponding terminal.

Figure 9:
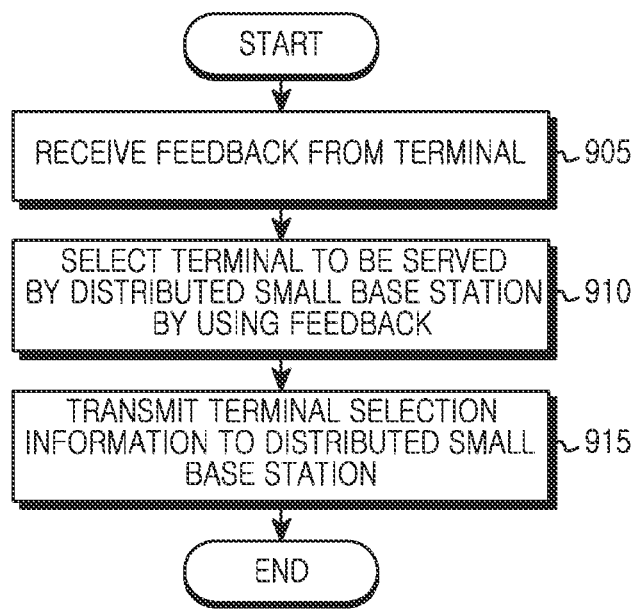
FIG. 9 is a flowchart illustrating an operation process of a central management unit according to an embodiment of the present disclosure.

FIG. 9 is a flowchart illustrating an operation process of a central management unit according to an embodiment of the present disclosure.

Referring to FIG. 9, at operation 905, the central management unit receives a feedback from distributed small base stations.

Thereafter, at operation 910, the central management unit performs a process of selecting a terminal to be served by the distributed small base station by using the feedback.

Thereafter, at operation 915, the central management unit transmits terminal selection information to the distributed small base station.

Figure 10:
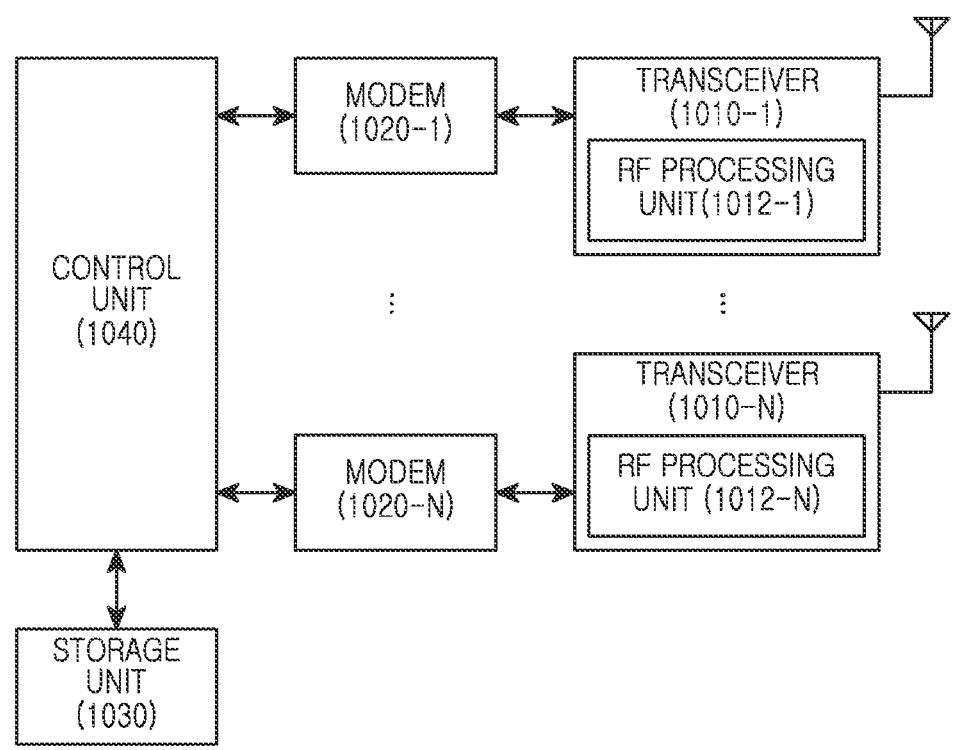
FIG. 10 is a diagram illustrating a block configuration of a distributed small base station according to an embodiment of the present disclosure.

FIG. 10 is a diagram illustrating a block configuration of a distributed small base station according to an embodiment of the present disclosure.

Referring to FIG. 10, the distributed small base station includes a plurality of transceivers 1010-1 to 1010-N, a plurality of modems 1020-1 to 1020-N, a storage unit 1030, and a control unit 1040.

The plurality of transceivers 1010-1 to 1010-N perform a function for transmitting and receiving signals through wireless channels. The plurality of transceivers 1010-1 to 1010-N may be installed dispersedly from each other.

According to various embodiments of the present disclosure, the plurality of transceivers 1010-1 to 1010-N may respectively include RF processing units 1012-1 to 1012-N. The RF processing units 1012-1 to 1012-N perform conversion between baseband signals and RF signals.

According to various embodiments of the present disclosure, the RF processing units 1012-1 to 1012-N may include an amplifier, a mixer, an oscillator, a Digital to Analog Convertor (DAC), and an analog to digital convertor.

According to various embodiments of the present disclosure, the plurality of modems 1020-1 to 1020-N may perform a function of conversion between a baseband signal and a bit stream according to a physical layer standard of a system.

According to various embodiments of the present disclosure, in data transmission, the plurality of modems 1020-1 to 1020-N may generate complex symbols by performing coding and modulation on a Transmit (Tx) bit-stream. In data reception, the plurality of modems 1020-1 to 1020-N may restore a Receive (Rx) bit-stream by demodulating and decoding baseband signals provided from the plurality of transceivers 1010-1 to 1010-N. According to an Orthogonal Frequency Division Multiplexing (OFDM) scheme, the plurality of modems 1020-1 to 1020-N may further perform a Fast Fourier Transform (FFT) operation and an Inverse Fast Fourier Transform (IFFT) operation.

Although the plurality of modems 1020-1 to 1020-N are illustrated in FIG. 10, according to various embodiments of the present disclosure, the plurality of modems 1020-1 to 1020-N may be configured as one block. In this case, one modem processes signals corresponding to the plurality of transceivers 1010-1 to 1010-N sequentially or in parallel. According to various embodiments of the present disclosure, the plurality of modems 1020-1 to 1020-N may be respectively included in the plurality of transceivers 1010-1 to 1010-N. For example, the plurality of transceivers 1010-1 to 1010-N may respectively include the RF processing units 1012-1 to 1012-N and the modems 1020-1 to 1020-N.

The storage unit 1030 stores programs for operations of the base station and data such as system information and setting information. In addition, the storage unit 1030 provides stored data in response to a request from the control unit 1040.

The control unit 1040 controls overall functions of the base station. For example, the control unit 1040 controls the plurality of transceivers 1010-1 to 1010-N and the plurality of modems 1020-1 to 1020-N.

According to various embodiments of the present disclosure, the control unit 1040 transmits a beam including a reference signal and a path loss value to a terminal and receives a feedback from the terminal.

According to various embodiments of the present disclosure, when the central management unit determines terminal selection, the control unit 1040 transmits the received feedback to the central management unit, receives terminal selection information to the central management unit, and provides a service to terminals by using the terminal selection information.

According to various embodiments of the present disclosure, when the central management unit does not determine terminal selection, the control unit 1040 performs a process of selecting terminals to be served by respective distributed small base stations by using the feedback.

According to various embodiments of the present disclosure, if required, the control unit 1040 may share the terminal selection information with distributed small base stations or notify the central management unit of the terminal selection information.

Figure 11:
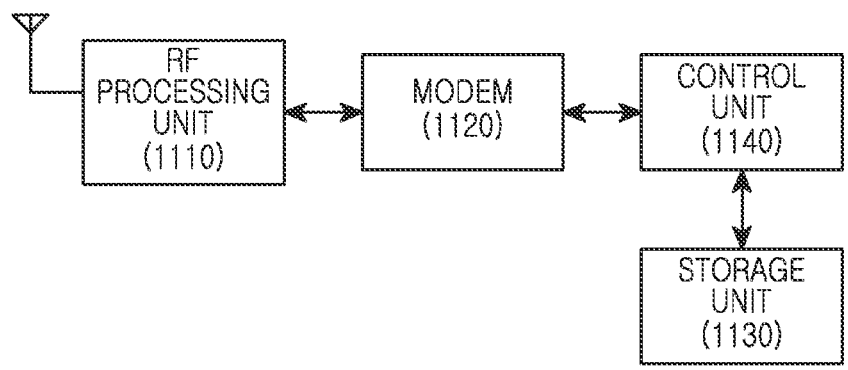
FIG. 11 is a diagram illustrating a block configuration of a terminal in a wireless communication system according to an embodiment of the present disclosure.

FIG. 11 is a diagram illustrating a block configuration of a terminal in a wireless communication system according to an embodiment of the present disclosure.

Referring to FIG. 11, the terminal includes a RF processing unit 1110, a modem 1120, a storage unit 1130, and a control unit 1140.

The RF processing unit 1110 performs functions for transmitting/receiving signals through radio channels, such as signal band conversion and amplification. For example, the RF processing unit 1110 up-converts a baseband signal received from the modem 1120 into an RF signal and transmits the RF signal through an antenna, The RF processing unit 1110 down-converts an RF signal received through the antenna into a baseband signal. According to various embodiments of the present disclosure, the RF processing unit 710 may include an amplifier, a mixer, an oscillator, a Digital-to-Analog Converter (DAC), an Analog-to-Digital Converter (ADC), and/or the like.

The modem 1120 performs a function of conversion between a baseband signal and a bit stream according to a physical layer standard of a system. For example, in data transmission, the modem 1120 generates complex symbols by performing coding and modulation on a Transmit (Tx) bit-stream. In data reception, the modem 1120 restores a Receive (Rx) bit-stream by demodulating and decoding baseband signals provided from the RF processing unit 1110. According to an Orthogonal Frequency Division Multiplexing (OFDM) scheme, the modem 1120 may further perform a FFT operation and an IFFT operation.

The storage unit 1130 stores mandatory programs for operations of the terminal, application programs, and data such as system information and setting information. In addition, the storage unit 1130 provides stored data in response to a request from the control unit 1140.

The control unit 1140 controls overall functions of the terminal. According to various embodiments of the present disclosure, the control unit 1140 receives a reference signal from a distributed small base station. The reference signal is included in a beam transmitted by the distributed small base station. The control unit 1140 may receive a path loss value from the distributed small base station.

According to various embodiments of the present disclosure, the control unit 1140 determines a candidate group of serving distributed small base stations and a candidate group of interference distributed small base stations.

According to various embodiments of the present disclosure, when the terminal is provided with a service by the distributed small base station, the control unit 1140 determines the number of bits for maximizing an expected rate.

According to various embodiments of the present disclosure, the control unit 1140 transmits a feedback according to the determined number of bits to an arbitrary distributed small base station.

According to various embodiments of the present disclosure, when determining the candidate group of serving distributed small base stations and the candidate group of interference distributed small base stations, the control unit 1140 determines distributed small base stations having priority values larger than a threshold value as the candidate group of serving distributed small base stations by using the priority values of distributed small base stations to which weighted values are reflected.

According to various embodiments of the present disclosure, when determining the candidate group of serving distributed small base stations and the candidate group of interference distributed small base stations, the control unit 1140 determines distributed small base stations having priority values equal to or larger than a predetermined ratio of the priority value of a distributed small base station having the largest priority value as the candidate group of serving distributed small base stations by using the priority values of distributed small base stations to which weighted values are reflected.

Figure 12:
FIG. 12 is a diagram illustrating a block configuration of a central management unit according to an embodiment of the present disclosure.

FIG. 12 is a diagram illustrating a block configuration of a central management unit according to an embodiment of the present disclosure.

Referring to FIG. 12, the central management unit includes a modem 1220, a storage unit 1230, and a control unit 1240.

The modem 1220 is a module for communicating with other devices. According to various embodiments of the present disclosure, the modem 1220 includes a wire processing unit, a baseband processing unit, and/or the like. The wire processing unit converts a signal received through a wire path to a baseband signal to provide the baseband signal to the baseband processing unit, and converts a baseband signal from the baseband processing unit to a wire signal to transmit the wire signal through an actual wire path.

The control unit 1240 controls overall functions of the central management unit. The control unit 1240 controls functions of the modem 1220 and storage unit 1230.

According to various embodiments of the present disclosure, the control unit 1240 performs a function of managing and controlling distributed small base stations.

The storage unit 1230 performs a function of storing programs for controlling overall operations of the central management unit and temporal data generated while the program is executed.

According to various embodiments of the present disclosure, the control unit 1240 receives feedback from distributed small base stations and selects a terminal to be served by the respective distributed small base stations using the feedback. Thereafter, the control unit 1240 transmits terminal selection information to the distributed small base stations.

According to various embodiments of the present disclosure, the terminal measures channels between the terminal and a plurality of distributed small base stations, and uses more feedback bits because the channel state of a channel is better and/or because the path loss of a channel is smaller.

Figure 13:
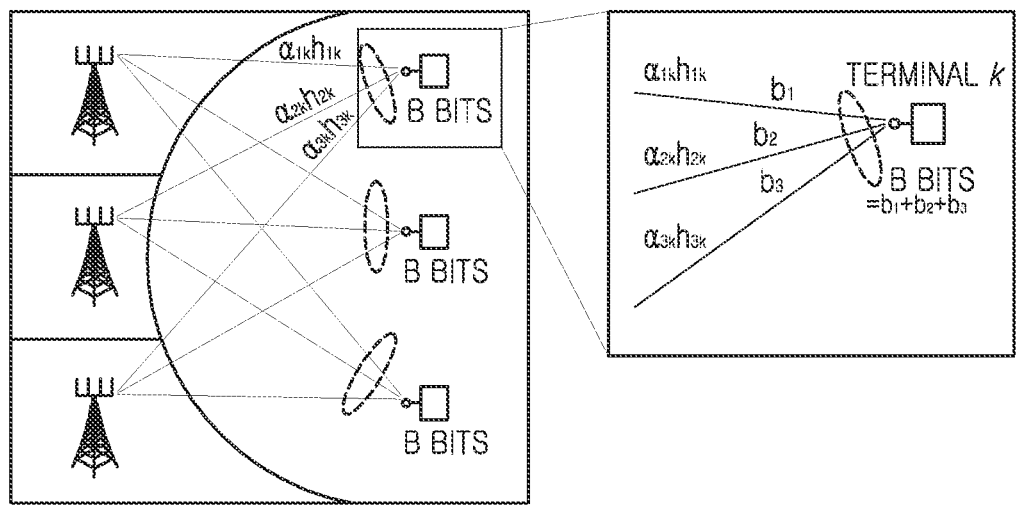
FIG. 13 is a diagram illustrating a process for feedback assignment in a terminal according to an embodiment of the present disclosure.

FIG. 13 is a diagram illustrating a process for feedback assignment in a terminal according to an embodiment of the present disclosure.

Referring to FIG. 13, a terminal K maximizes an expected rate when receiving a service from one distributed small base station from a candidate group S of serving distributed small base stations.

To this end, the terminal K measures channels between the terminal K and a plurality of distributed small base stations, and uses more feedback bits because the channel state of a channel is better and/or because the path loss of a channel is smaller.

Referring to FIG. 13, when there are three distributed small base stations and the channel state of a first distributed small base station is better, the terminal K assigns the largest number of bits of total B bits to b1.

Figure 14:
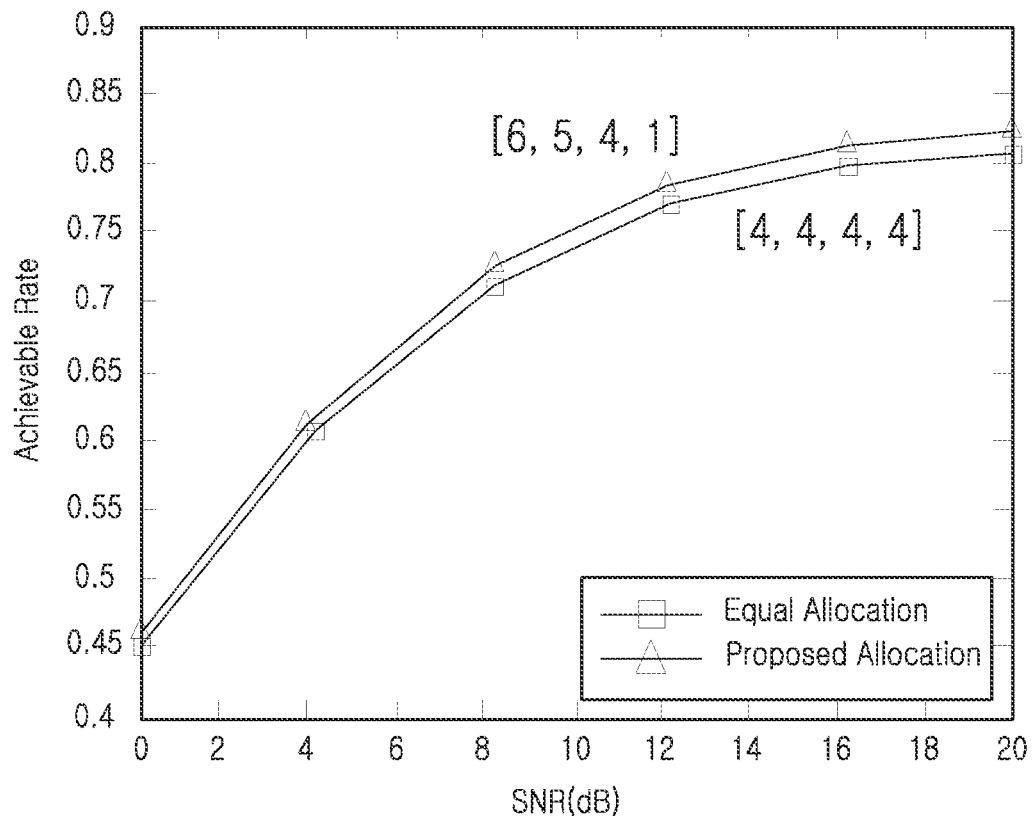
FIG. 14 is a graph illustrating performance according to an embodiment of the present disclosure.

FIG. 14 is a graph illustrating performance according to an embodiment of the present disclosure.

Referring to FIG. 14, an average rate is illustrated which may be obtained when there are four distributed small base stations from which one terminal may receive a service and which have path loss values respectively corresponding to [1.2, 1, 0.8, 0.4]. FIG. 14 illustrates a case in which the number of all feedback used in respective terminals is 16 bits. As seen in FIG. 14, when a proposed feedback division method is used, a transmission speed becomes larger.

Figure 15:
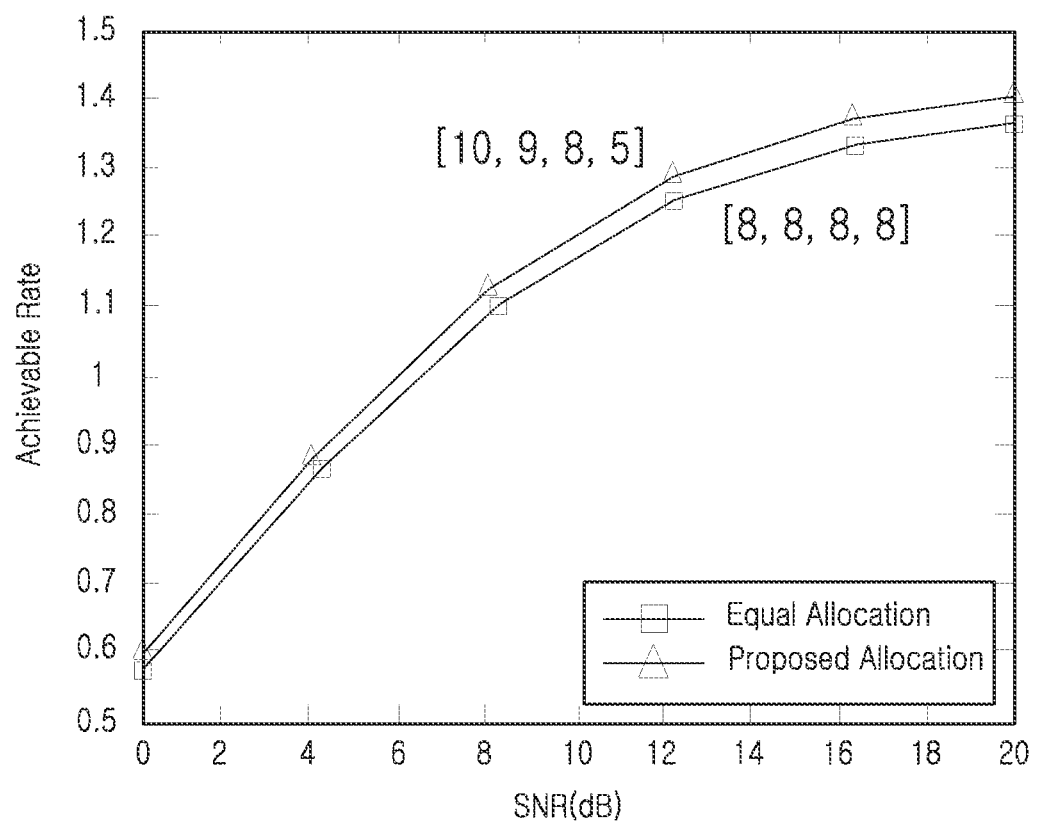
FIG. 15 is a graph illustrating performance according to an embodiment of the present disclosure.

FIG. 15 is a graph illustrating performance according to an embodiment of the present disclosure.

Referring to FIG. 15, an average rate is illustrated, which may be obtained when there are four distributed small base stations from which one terminal may receive a service and which have path loss values respectively corresponding to [1.2, 1, 0.8, 0.4]. FIG. 15 illustrates a case in which the number of all feedback used in respective terminals is 32 bits. As seen in FIG. 15, when a proposed feedback division method is used, a transmission speed becomes larger.

Figure 16:
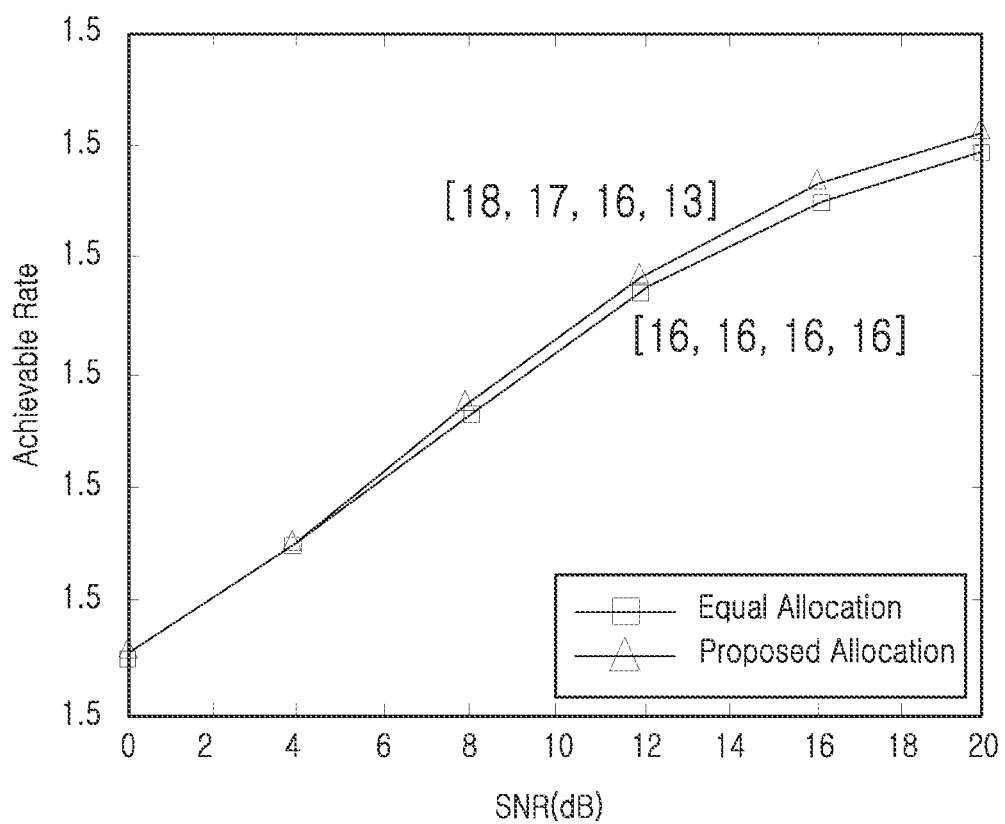
FIG. 16 is a graph illustrating performance according to an embodiment of the present disclosure.

FIG. 16 is a graph illustrating performance according to an embodiment of the present disclosure.

Referring to FIG. 16, an average rate is illustrated which may be obtained when there are four distributed small base stations from which one terminal may receive a service and which have path loss values respectively corresponding to [1.2, 1, 0.8, 0.4]. FIG. 16 illustrates a case in which the number of all feedback used in respective terminals is 64 bits. As seen in FIG. 16, when a proposed feedback division method is used, a transmission speed becomes larger.

Various embodiments of the present disclosure efficiently use the amount of feedback that are limited resources in a virtual cellular network communication system, thereby averagely minimizing performance loss caused by incomplete channel information from a user terminal.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in a terminal in a wireless communication system, the method comprising:
   determining a candidate group of serving distributed small base stations;
   determining at least one number of feedback bits corresponding to at least one distributed base station that belongs to the candidate group based on at least one path loss of the at least one distributed small base station; and
   transmitting a feedback according to the at least one number of feedback bits to the at least one distributed small base station.

2. The method of claim 1, further comprising:
   receiving the at least one path loss value for at least one distributed small base station;
   wherein the determining of the candidate group of serving distributed small base stations is based on the at least one path loss value.

3. The method of claim 1, wherein the determining of the candidate group of serving distributed small base stations comprises:
   determining, according to respective priority values of the distributed small base stations, distributed small base stations having priority values larger than a threshold value as belonging to the candidate group of serving distributed small base stations.

4. The method of claim 3, wherein the priority values are expressed as a following Equation:

$$Xn = \alpha n \beta n$$

where Xn is a priority value of an n-th base station, αn is a path loss value from the n-th base station, and βn is a penalty of the n-th base station.

5. The method of claim 1, wherein the determining of the candidate group of serving distributed small base stations comprises:
   determining, according to respective priority values of the distributed small base stations, distributed small base stations having priority values equal to or larger than a predetermined ratio of a largest priority value as belonging to the candidate group of serving distributed small base stations.

6. The method of claim 1, wherein the determining of the candidate group of serving distributed small base stations comprises:
   determining, according to respective priority values of the distributed small base stations to which weighted values are reflected, distributed small base stations having priority values larger than a threshold value as belonging to the candidate group of serving distributed small base stations.

7. The method of claim 6, wherein the priority values are expressed as a following Equation:

$$Xn = \alpha n \beta n Wn$$

where Xn is a priority value of an n-th base station, αn is a path loss value from the n-th base station, βn is a penalty of the n-th base station, and Wn is a weighed value of the n-th base station.

8. The method of claim 1, wherein the determining of the candidate group of serving distributed small base stations comprises:
   determining, according to respective priority values of the distributed small base stations to which weighted values are reflected, distributed small base stations having priority values equal to or larger than a predetermined ratio of a largest priority value as belonging to the candidate group of serving distributed small base stations.

9. The method of claim 1, wherein, when the at least one number of feedback bits is proportional to at least one channel state between the at least one distributed small base station and the terminal.

10. An apparatus of a terminal in a wireless communication system, the apparatus comprising:
    a transceiver;
    a control unit configured to:
       determine a candidate group of serving distributed small base stations,
       determine at least one number of feedback bits corresponding to at least one distributed base station that belongs to the candidate group based on at least one path loss of the at least one distributed small base station, and
       transmit a feedback according to the at least one number of feedback bits to the at least one distributed small base station via the transceiver.

11. The apparatus of claim 10,
    wherein the controller is further configured to:
       receive the at least one path loss value for the at least one distributed small base stations, and
       determine the candidate group of serving distributed small base stations based on the at least one path loss value.

12. The apparatus of claim 10, wherein the control unit is further configured to determine, according to respective priority values of the distributed small base stations, that distributed small base stations having priority values larger than a threshold value as belonging the candidate group of serving distributed small base stations when determining the candidate group of serving distributed small base station.

13. The apparatus of claim 12, wherein the priority values are expressed by:

$$Xn = \alpha n \beta n$$

where Xn is a priority value of an n-th base station, αn is a path loss value from the n-th base station, and βn is a penalty of the n-th base station.

14. The apparatus of claim 10, wherein the control unit is further configured to determine, according to respective priority values of the distributed small base stations, distributed small base stations having priority values equal to or larger than a predetermined ratio of a largest priority value as belonging to the candidate group of serving distributed small base stations when determining the candidate group of serving distributed small base station.

15. The apparatus of claim 10, wherein the control unit is further configured to determine, according to respective priority values of the distributed small base stations to which weighted values are reflected, that distributed small base stations having priority values larger than a threshold value as belonging to the candidate group of serving distributed small base stations when determining the candidate group of serving distributed small base station.

16. The apparatus of claim 15, wherein the priority values are expressed by:

$$Xn = \alpha n \beta n Wn$$

where Xn is a priority value of an n-th base station, αn is a path loss value from the n-th base station, βn is a penalty of the n-th base station, and Wn is a weighed value of the n-th base station.

17. The apparatus of claim 10, wherein the control unit is further configured to determine, according to respective priority values of the distributed small base stations to which weighted values are reflected, that distributed small base stations having priority values equal to or larger than a predetermined ratio of a largest priority value as belonging to the candidate group of serving distributed small base stations when determining the candidate group of serving distributed small base station.

18. The apparatus of claim 10, wherein the at least one number of feedback bits is proportional to at least one channel state between the at least one distributed small base station and the terminal.

19. A method of a base station in a wireless communication system, the method comprising:
receiving at least one feedback from at least one terminal;
determining at least one terminal to be served by the base station based on the at least one feedback; and
sharing information on the determined at least one terminal with another base station,
wherein a structure of the at least one feedback is determined according to at least one number of feedback bits corresponding to at least one base station that includes the base station, and the at least one number of feedback bits is determined based on at least one path loss of the at least one base station.

20. The method of claim 19, wherein the at least one number of feedback bits is proportional to at least one channel state between the at least one base station and a terminal.

21. The method of claim 19, further comprising:
transmitting a path loss value to the at least one terminal.

22. An apparatus of a base station in a wireless communication system, the apparatus comprising:
a transceiver;
a control unit configured to:
receive at least one feedback from at least one terminal via the transceiver,
determine at least one terminal to be served by the base station based on the at least one feedback, and to share information on the determined at least one terminal with another base station,
wherein a structure of the at least one feedback is determined according to at least one number of feedback bits corresponding to at least one base station that includes the base station, and the at least one number of feedback bits is determined based on at least one path loss of the at least one base station.

23. The apparatus of claim 22, wherein the at least one number of feedback bits is proportional to at least one channel state between the at least one base station and a terminal.

24. The apparatus of claim 22, wherein the transceiver is further configured to transmit a path loss value to the at least one terminal.

* * * * *